Figure 1:
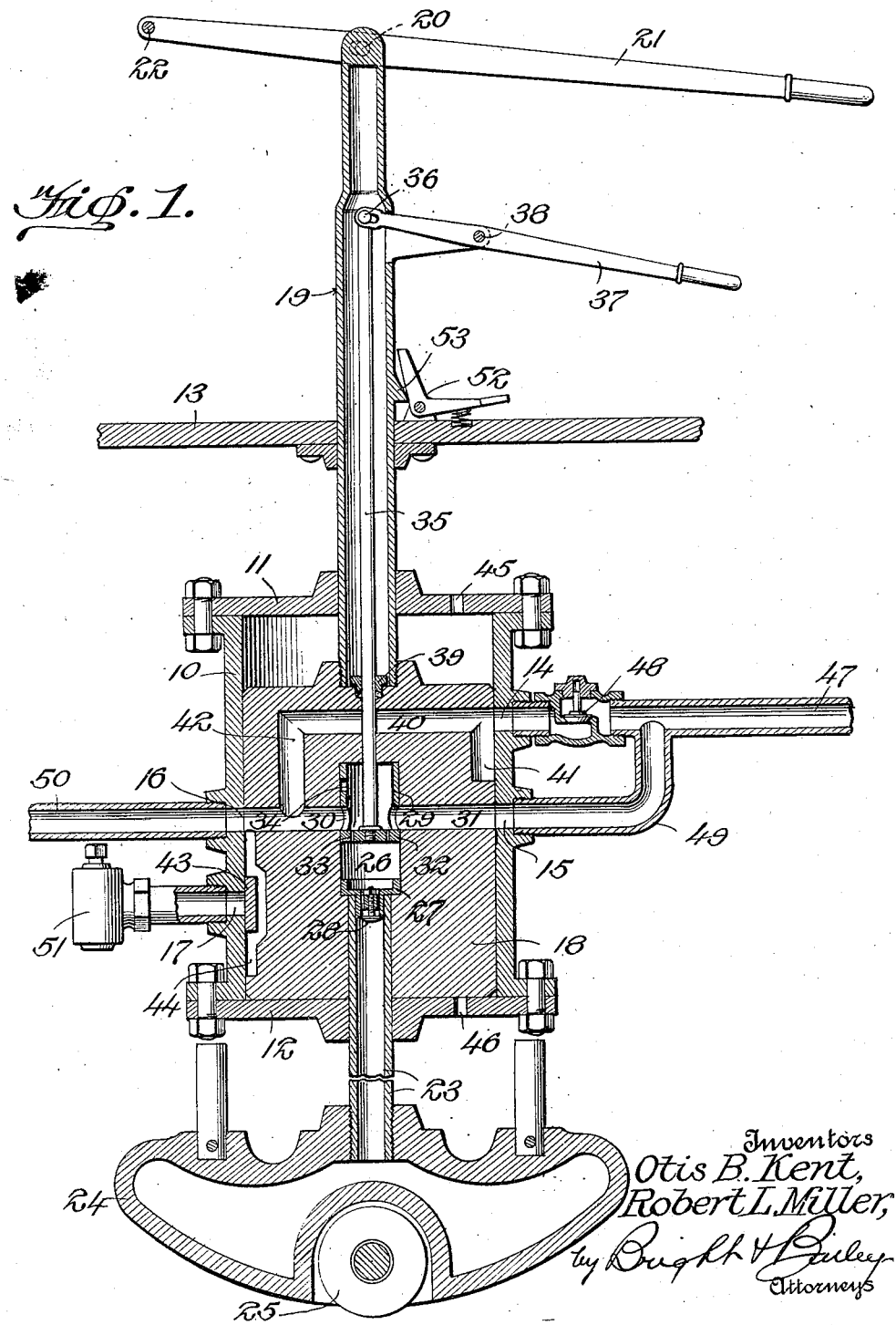

March 4, 1924.

O. B. KENT ET AL 1,485,417

VALVE MECHANISM FOR AUTOMATIC TRAIN CONTROL APPARATUS

Filed July 27, 1921    3 Sheets-Sheet 1

Inventors
Otis B. Kent,
Robert L. Miller,
by Dwight & Duley
Attorneys

March 4, 1924.

O. B. KENT ET AL 1,485,417

VALVE MECHANISM FOR AUTOMATIC TRAIN CONTROL APPARATUS

Filed July 27, 1921  3 Sheets-Sheet 2

Inventors
Otis B. Kent,
Robert L. Miller,
by Bright & Bailey
Attorneys

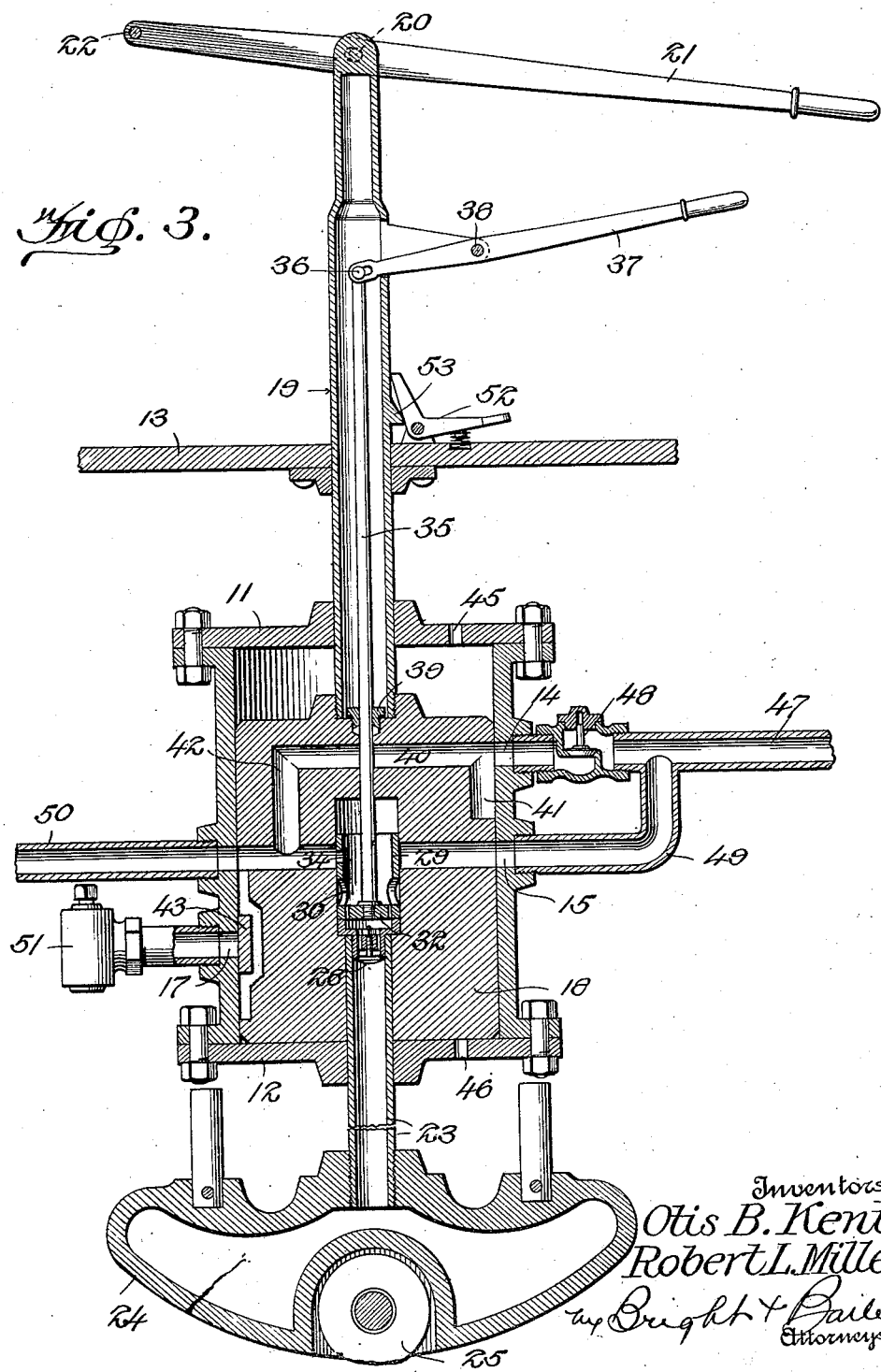

Patented Mar. 4, 1924.

1,485,417

UNITED STATES PATENT OFFICE.

OTIS B. KENT, OF WASHINGTON, DISTRICT OF COLUMBIA, AND ROBERT L. MILLER, OF SPOKANE, WASHINGTON; SAID MILLER ASSIGNOR TO OTIS AUTOMATIC TRAIN CONTROL, INC., OF SPOKANE, WASHINGTON, A CORPORATION OF WASHINGTON.

VALVE MECHANISM FOR AUTOMATIC TRAIN-CONTROL APPARATUS.

Application filed July 27, 1921. Serial No. 487,946.

*To all whom it may concern:*

Be it known that we, OTIS B. KENT and ROBERT L. MILLER, citizens of the United States, and residents of Washington, in the District of Columbia, and Spokane, in the county of Spokane and State of Washington, respectively, have invented certain new and useful Improvements in Valve Mechanism for Automatic Train-Control Apparatus, of which the following is a specification.

Our invention relates to improvements in valve mechanisms for automatic train control apparatus of the general type disclosed in the copending application of Higgins and Miller filed March 28, 1921 and serially numbered 456,226, and as stated in said copending application, it is also our present purpose to provide a valve mechanism which may be controlled by the engineer to set or release his brakes during such times as he is alert and properly observant of signals, but which will act, upon contact with track devices which are preferably operated in conjunction with the signals, to cause an automatic application of his brakes in the event he fails to observe or heed said signals.

It is also our purpose to provide a valve mechanism of the type mentioned which is of comparatively simple and inexpensive construction, possessing relatively few parts compactly arranged and unlikely to get out of order, being therefore dependable in its operation, and which is positive in its action.

Our inventive idea is capable of embodiment in different mechanical constructions and arrangements, one of which is illustrated in the accompanying drawings, but it is to be understood that the structure shown is merely intended as a disclosure of the essential features and novel characteristics of our invention in a preferred form, and that various changes, modifications and additions may be made in and to the same within the scope of our invention as defined in the appended claims.

In the drawings which are illustrative of features of novelty to be more fully described in detail hereinafter, and wherein like characters of reference denote corresponding parts in the different views:—

Figure 2:
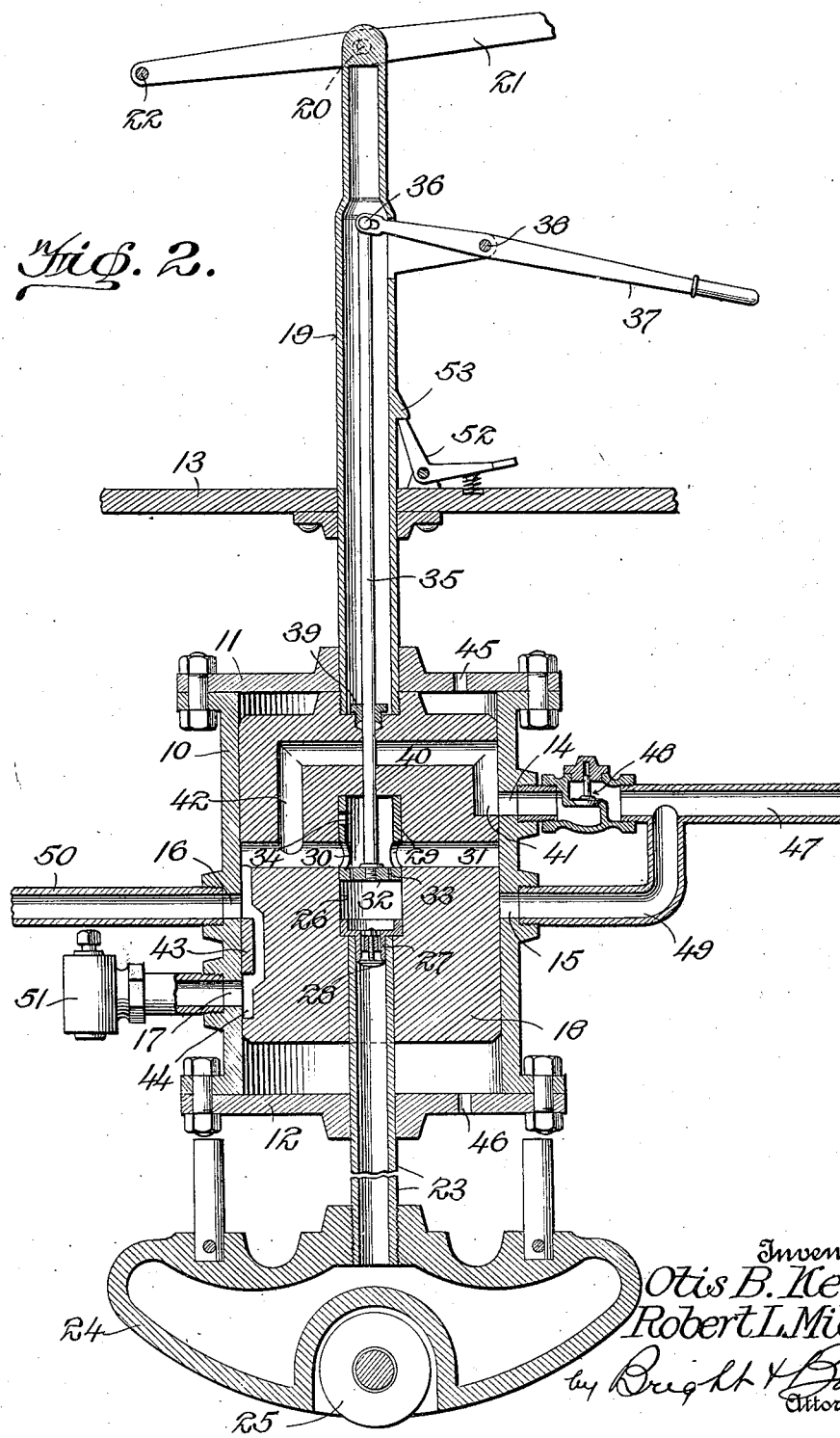

Fig. 1 is a vertical section showing our improved valve mechanism in its normal position;

Fig. 2, a similar view showing the relation of parts when the mechanism has been operated to cause an application of the train brakes; and Fig. 3, a similar view showing the relation of parts when the mechanism has been operated through the breakage of one of its elements to cause an application of the brakes.

Referring now to the drawings in detail, 10 designates a valve casing which is preferably though not necessarily closed at its ends by upper and lower heads 11 and 12, respectively, and which is adapted to be suitably and permanently secured to a locomotive or other like vehicle at some convenient point preferably beneath the cab floor or platform 13 thereof, whereby certain movable elements of the mechanism are disposed for actuation either from within the cab or by suitable ramp devices (not shown) located along the tracks.

In one side of the casing 10 near its upper end is formed a port 14 and slightly below this port and in vertical alinement therewith is formed a second port 15. At another point in the casing, preferably diametrically opposite to the port 15 and in the same horizontal plane as the latter is formed a third port 16, while directly below and in vertical alinement with this last port is formed a fourth port 17.

Slidably arranged in the casing is a piston 18 provided at its upper end with a tubular stem 19 which extends through the head 11 and floor 13 and at its upper end has pivoted connection as at 20 with an intermediate portion of a lever 21 which is pivoted at one end as at 22 to a fixed element of the vehicle structure.

Carried by the piston 18 and extending through the lower head 12 is a pipe 23 which in turn carries at its lower end a hollow shoe 24 having a ramp engaging roller 25 journaled therein which projects slightly below the lower rounded face of said shoe. Pipe 23 extends into the piston a suitable distance and is secured therein in any suitable manner, being in communication at its upper end with a bore 26 formed in said piston and at its lower end being in communication with the interior of the hollow shoe as shown.

The bore 26 is preferably of somewhat greater diameter than the pipe 23 to thereby provide a shoulder at its lower end, and seated against this shoulder is the housing 27 of a graduating valve 28 of any well known or preferred construction.

Vertically slidable in the bore 26 is a tubular plug 29 through which extends a transverse opening 30 providing a means of communication at predetermined times through a transverse passage 31 formed in the piston and consisting of the two portions separated by said bore 26, said passage 31 in turn and at predetermined times providing a means of communication between ports 15 and 16.

Below the opening 30 the plug 29 is formed in the shape of a disk 32 which neatly fits the bore 26 and is provided with one or more small apertures 33 forming a means of communication between opening 30 and the hollow shoe 24 through said graduating valve 28 and pipe 23. Also formed in the side of the plug 29 that is disposed towards the port 16 is a relatively small passage 34 that opens into the interior of the plug and is constantly in communication with the passage 30.

Fixed to the plug 29 is a rod 35 which extends upward through the piston and through the hollow stem 19 to a suitable point above the floor 13 where it is pivotally connected as at 36 with one end of a lever 37 which latter extends through a slot in the wall of the hollow stem and is intermediately pivoted as at 38 to a suitable bracket projecting from said stem. Surrounding the rod 35 at the point where it enters the piston 18 is a stuffing box 39.

Above the passage 31 a second transverse passage 40 extends partially through the piston 18 and at one end opens through the sides of said piston in an elongated vertically disposed portion 41 which is at all times in registration with port 14. The other end of said passage 40 is extended downward as at 42 and opens into passage 31 between the bore 26 and that side of the piston disposed towards port 16.

Extending downward from the passage 31 past a solid portion 43 of the piston which is disposed so as to at predetermined times cover and uncover port 17, is a channel 44 which opens through the side of said piston throughout a portion of its length below said solid portion.

Piston 18 as previously mentioned is slidable in the casing and is adapted to be moved upward or downward therein within predetermined limits, small pressure release apertures 45 and 46 being formed in the heads 11 and 12, respectively, to admit of its free and unimpeded movement.

The mechanism as described in the foregoing constitutes substantially our complete improved valve which may be connected with the usual train line pipe and with the usual engineer's valve in any desired manner, one preferred manner, as shown, being to connect the engineer's valve by a pipe 47 with the port 14, interpose in said pipe 47 a check valve 48 opening in the direction of the engineer's valve, connect pipe 47, between check 48 and the engineer's valve, with port 15 by means of a branch pipe 49, and connect port 16 with the usual train line pipe 50. Connected with the port 17 is a graduating valve 51 of any preferred or well known type.

Normally the piston 18 is disposed at its lowermost limit of movement within the casing 10 and the plug 29 is disposed at its uppermost limit of movement within the bore 26, in which position the train line pipe and the engineer's valve are in free communication through ports 15, 16, passages 30, 31, and pipes 47 and 49, whereby the engineer's valve may be manipulated to control the air pressure in the train line and consequently the brakes in the ordinary manner, since as shown the escape of air through the graduating valve 51 is prevented by the solid portion 43 of the piston normally closing port 17.

With the piston in its normal lowermost position the shoe 24 is disposed to engage with and be raised by a ramp device in the event the engineer permits his train to pass over such ramp device when the latter is set in active position, that is, in position to actuate the mechanism just described to cause an automatic application of the brakes. Assuming the latter condition it will be observed that raising the shoe will also raise the pipe 23 and consequently the piston 18, whereupon the passage 31 will be disalined with ports 15 and 16 and communication between the engineer's valve and the train line pipe will thus be cut off, except through passage 40 and check valve 48, the latter then limiting the use of the engineer's valve to reducing pressure in the train line to apply the brakes and as is apparent, preventing a raising of the pressure by manipulation of the engineer's valve to release the brakes. In other words when the shoe is raised by engagement with an active ramp, port 17 is uncovered and air is exhausted from the train line through channel 44 and graduating valve 51 thus reducing the train line pressure and causing the brakes to be applied, graduating valve having previously been adjusted to permit a quick or gradual release of pressure to bring the train to a more or less sudden stop as may be desired. Preferably it is set to permit a gradual release of pressure and if it is desired to hasten the action of the brakes, additional pressure may be released by means of the engineer's valve by way of passage 40 and check valve 48.

Any desired means may be provided to hold the piston in its raised position until the mechanism can be manually returned to its normal status following actuation thereof by an active ramp. Such means may consist as shown of a latch member 52 pivoted to the cab floor and engageable under a protuberance 53 on the hollow stem 19 when the piston is raised, and releasable in any preferred manner to permit the lever 21 to be moved to lower the piston, which is necessary to restore the normal status of the device.

In conjunction with the mechanism described in the foregoing, means has been provided to cause an automatic application of the brakes in the event of breakage or fracture of any part of the hollow shoe 24 or stem 23, such means consisting of the previously mentioned plug 29 and its associated parts.

It will be noted that the hollow shoe and pipe 23 are subject to the same pressure that exists in the train line, and if either the shoe or pipe breaks or is fractured there is an immediate release of pressure to the atmosphere. Consequently the air in the train line in its attempt to rush out through the break acts against the upper face of disk 32 to move both the disk and plug 29 downward. This results in communication through passage 31 being cut off, while air from the train line 50 escapes through passage 34, apertures 33 in the disk 32, past the graduating valve 28 and on out through the break to the atmosphere, the action being the same as when air is exhausted through graduating valve 51, engineer's valve being only capable of manipulation to hasten the reduction of the train line pressure. After the break has been mended lever 37 is actuated to raise the plug 29 and restore its associated parts to normal position.

From the foregoing description taken in connection with the accompanying drawings it is believed that the construction, operation and advantages of our improved mechanism will be clearly understood, and while we have disclosed one specific embodiment of our invention we do not limit ourselves thereto except for such limitations as are contained in the appended claims.

We claim:—

1. In automatic train control apparatus, mechanism including a valve normally establishing communication between the train pipe and a source of fluid pressure supply, a hollow ramp engageable shoe in communication with the train pipe and operable at predetermined times to cause said valve to deny communication between the train pipe and said source of supply, a member normally establishing communication between the train pipe and said hollow shoe and movable by the pressure of fluid in the train pipe also to deny communication between the train pipe and said source of supply in the event of breakage or fracture of said shoe, said member including a perforated disk against which the pressure of fluid in the train pipe acts to move the member into position to effect denial of the communication aforementioned, and the communication between the train pipe and said hollow shoe being through the perforations of said disk.

2. In automatic train control apparatus, a casing, mechanism including a valve within said casing normally establishing communication between the train pipe and a source of fluid pressure supply, a hollow ramp engageable shoe in communication with the train pipe and operable at predetermined times to cause said valve to deny communication between the train pipe and said source of supply, a member carried by said valve normally establishing communication between the train pipe and said hollow shoe and movable by the pressure of fluid in the train pipe also to deny communication between the train pipe and said source of supply in the event of breakage or fracture of said shoe, and a rod extending from said member exteriorly of the casing for resetting the member following repair of the break or fracture in said shoe.

In testimony whereof we hereunto affix our signatures.

OTIS B. KENT.
ROBERT L. MILLER.